US 9,767,029 B2

(12) United States Patent
Amit et al.

(10) Patent No.: US 9,767,029 B2
(45) Date of Patent: Sep. 19, 2017

(54) DATA DECOMPRESSION USING A CONSTRUCTION AREA

(71) Applicant: INTERNATIONAL BUSINESS MACHINES CORPORATION, Armonk, NY (US)

(72) Inventors: Jonathan Amit, Omer (IL); Dolev Ish Am, Tel Aviv (IL); Sergey Marenkov, Tel Aviv (IL); Ben Sasson, Yaffo (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 278 days.

(21) Appl. No.: 14/259,563

(22) Filed: Apr. 23, 2014

(65) Prior Publication Data

US 2015/0309740 A1    Oct. 29, 2015

(51) Int. Cl.
*G06F 12/0871*    (2016.01)

(52) U.S. Cl.
CPC .... *G06F 12/0871* (2013.01); *G06F 2212/282* (2013.01); *G06F 2212/312* (2013.01); *G06F 2212/401* (2013.01)

(58) Field of Classification Search
None
See application file for complete search history.

(56) References Cited

U.S. PATENT DOCUMENTS

| | | | |
|---|---|---|---|
| 5,301,351 A * | 4/1994 | Jippo | G06F 5/06 709/228 |
| 5,774,715 A * | 6/1998 | Madany | G06F 17/30153 |
| 5,813,011 A | 9/1998 | Yoshida et al. | |
| 8,407,193 B2 | 3/2013 | Gruhl et al. | |
| 8,607,012 B2 | 12/2013 | Yamamoto et al. | |
| 2005/0198062 A1 | 9/2005 | Shapiro | |
| 2009/0228662 A1 * | 9/2009 | Chang | G06F 12/0246 711/148 |
| 2011/0179228 A1 | 7/2011 | Amit et al. | |
| 2012/0331258 A1 * | 12/2012 | Yamamoto | G06F 11/1451 711/171 |

* cited by examiner

*Primary Examiner* — Sean D Rossiter
*Assistant Examiner* — Charles Choi
(74) *Attorney, Agent, or Firm* — Griffiths & Seaton PLLC

(57) ABSTRACT

For serving sequential read patterns from a compressed journal storage system, a construction area cache algorithm is used to temporarily store the read and decompressed data in a user view sequential order to minimize disk I/Os and CPU utilization while serving the data to the user.

14 Claims, 8 Drawing Sheets

DATA DECOMPRESSION USING A CONSTRUCTION AREA

BACKGROUND OF THE INVENTION

Field of the Invention

The present invention relates generally to computers, and more particularly, to data decompression using a construction area.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components. Data compression is widely used to reduce the amount of data required to process, transmit, or store a given quantity of information. Data compression is the coding of data to minimize its representation. Compression can be used, for example, to reduce the storage requirements for files, to increase the communication rate over a channel, or to reduce redundancy prior to encryption for greater security. However, data compression consumes a significant amount of computing (e.g. central processing unit "CPU") resources. Also, data can be lost due to problems such as system crashes, hardware failures, and abnormal computing system halts. Journaled file systems can be used to maintain data integrity when these types of problems occur.

SUMMARY OF THE DESCRIBED EMBODIMENTS

In one embodiment, a method is provided for data decompression using a construction area using at least one processor device in a computing environment. In one embodiment, by way of example only, for reading compressed data stored in a journaling format, the method decompresses data from compressed data blocks and copies the decompressed data into the construction area in a sequential order to temporarily store the decompressed data for conducting sequential read operations from the construction area.

In another embodiment, a computer system is provided for data decompression using a construction area using at least one processor device in a computing environment. The computer system includes a computer-readable medium and at least one processor in operable communication with the computer-readable medium. In one embodiment, by way of example only, read operations, using at least one processor device decompresses data from compressed data blocks and copies the decompressed data into the construction area in a sequential order to temporarily store the decompressed data for conducting sequential read operations from the construction area.

In a further embodiment, a computer program product is provided for data decompression using a construction area using at least one processor device in a computing environment. The computer-readable storage medium has computer-readable program code portions stored thereon. The computer-readable program code portions include a first executable portion that decompresses data from compressed data blocks and copies the decompressed data into the construction area in a sequential order to temporarily store the decompressed data for conducting sequential read operations from the construction area.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

Figure 1:
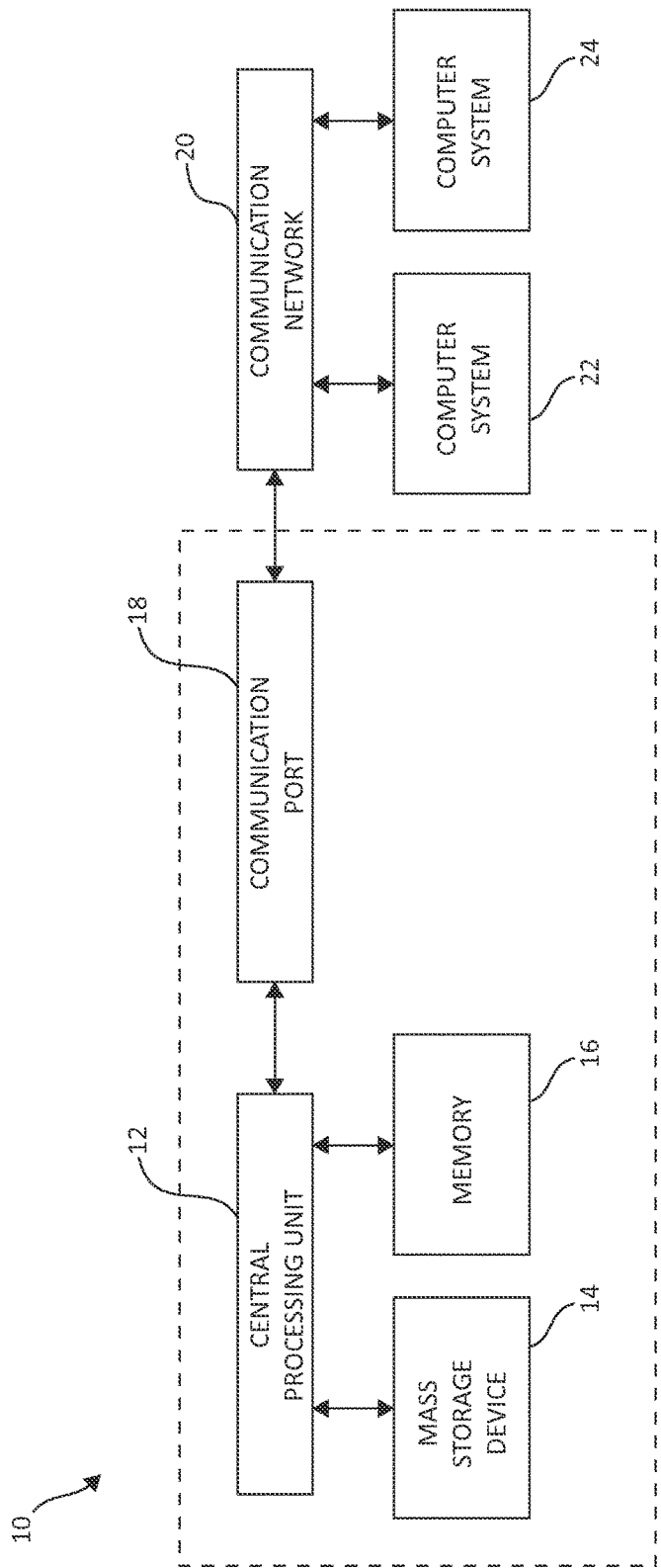
FIG. 1 is a block diagram illustrating a computer storage environment having an exemplary storage device in which aspects of the present invention may be realized.

Compressing data is an efficient way to save space on storage systems. It allows enhanced space efficiency by compressing user data to the storage in real time and decompressing it on user read demand. Improving restore speed for backup systems that use inline Chunk-Based Deduplication is designed to reduce the amount of disk input/output (I/Os) done per each section.

For example, slow restoration due to chunk fragmentation is a serious problem facing inline chunk-based data deduplication systems: restore speeds for the most recent backup can drop orders of magnitude over the lifetime of a system. To improve slow restoration, the following may be performed: increasing cache size, container capping, and using a forward assembly area—for alleviating this problem. Container capping is an ingest-time operation that reduces chunk fragmentation at the cost of forfeiting some deduplication, while using a forward assembly area is a restore-time caching and prefetching technique that exploits the perfect knowledge of future chunk accesses available when restoring a backup to reduce the amount of RAM required for a given level of caching at restore time.

For example, a forward assembly area is a restore-time caching and prefetching technique that may use one chunk-container-sized I/O buffer, where a large forward assembly area where the next M bytes of the restored backup will be assembled, and a recipe buffer large enough to hold the part of the recipe that describes the piece being assembled. In the simplest case, M-byte slices of the backup are restored at a time by first assembling each M-byte backup slice in the forward assembly area and then sending it out in a single piece. To restore an M-byte slice, the corresponding part of the recipe is first read into the recipe buffer. From that recipe part, it is determined which chunks are needed to fill which byte ranges (chunk spots) of the forward assembly area.

Additionally, in some compressed data systems, data is written to disk in a log-structured (journal) format. Data is compressed in the order it is written by the user/application (time-based-compression/temporal locality). After user data is compressed, it is written into physical fixed-size blocks, each compressed block might hold several user logs from different and not adjacent virtual offsets.

More specifically, in a data processing system or computing environment, a journaling (e.g., a block) storage system may be used to store write operations in a journal (e.g., in a block). In a compressed journal system, the journal (e.g., block) holds compressed data. Journal system maintains file system integrity by recording information regarding updates to directories, bitmaps, and/or data, in a log, also called a journal, before the updates are written to a storage device such as a hard disk. In the event of a system crash or other problem, the information in the journal may be used to restore the file system to a consistent state. Full-journaling systems additionally perform data journaling, in which data updates are also stored in the journal, to ensure that no committed data is lost. In one embodiment, the ability to access the data randomly is accomplished by dividing the journal into blocks that use a separate dictionary.

Journal (e.g., block) storage may be characterized by the write pattern of the journal/block storage. Data chunks are stored in the order they were written, so a logical offset of the data chunk has little or no relation to the physical location of the data chunk on the storage backend. Each data chunk is stored following the previous data chunk and invalidates any earlier data chunks written to same logical area.

Such approach improves the efficiency when it comes to serving random and/or read-in-write-order I/O patterns. However, this approach has some downsides when comes to sequential data read. In a worst case scenario the following example is provided. A sequential read (in big chunks) of data is written with random distribution characteristics. In this case, each user read is likely to require multiple physical blocks to be read and decompressed. Each block is read, decompressed and some of the block's data is used to serve the user read. However, since user offsets inside physical blocks are not necessarily adjacent, most of the data remain unused in cache. Moreover, since cache size is limited, many blocks will be evicted before further data will be consumed. The sequential read pattern ensures it will be read and decompressed again, causing I/O and CPU overhead.

To improve the efficiency relating to the above I/O patterns, the present invention provides a solution for high performance sequential user read from compressed volumes by decompressing data using a construction area. In one embodiment, by way of example only, for reading compressed data stored in a journaling format, data from compressed data blocks are decompressed. The decompressed data is then copied into the construction area in a sequential order to temporarily store the decompressed data for conducting sequential read operations from the construction area. Thus, the present invention provides a solution for usage of log data structure, forward Assembly area, and sequential read pattern detection to form a "construction area". The construction area cuts down not only the redundant disk reads but also the CPU required for the decompression process. In one embodiment, for serving sequential read patterns from a compressed journal storage system, the construction area cache algorithm is used to temporarily store the read and decompressed data in a user view sequential order to minimize disk I/Os and CPU utilization while serving the data to the user.

In one embodiment, when a sequential read pattern is detected, a construction area is allocated in the cache. Each section read by the user will require extracting data from several blocks on the disk. Since data was written with random distribution characteristics, each of these blocks may consist of logs of data, which will be relevant only for later on user read sections. These sections will also be required since the sequential read pattern will eventually reach them. During the sequential read, each of the extracted data block logs, which are read and decompressed are copied in to the construction area. Each log is copied into its own designated area in the construction area. The data block logs are ordered by their user view of the file, i.e. virtual view. Each section in the construction area, already returned to the user, is freed. Free sections can either be re designated for other cache uses or can be used for cyclic buffer implementation.

Thus, the present invention allows for dramatic reduction of disk I/Os as well as drastic improvement of CPU utilization during sequential read of compressed volumes. Also, the embodiments described herein allow for a reduction in I/Os and improves CPU utilization by using the memory much more efficiently then the standard LRU caching.

Thus, the by adapting the in-memory cache into a construction area, the construction area allows for achieving a high hit ratio in specific workloads. Moreover, the construction areal does not require any disk space allocation or additional I/Os, and the in-memory cache is used for serving both random and sequential patters.

Figure 2:
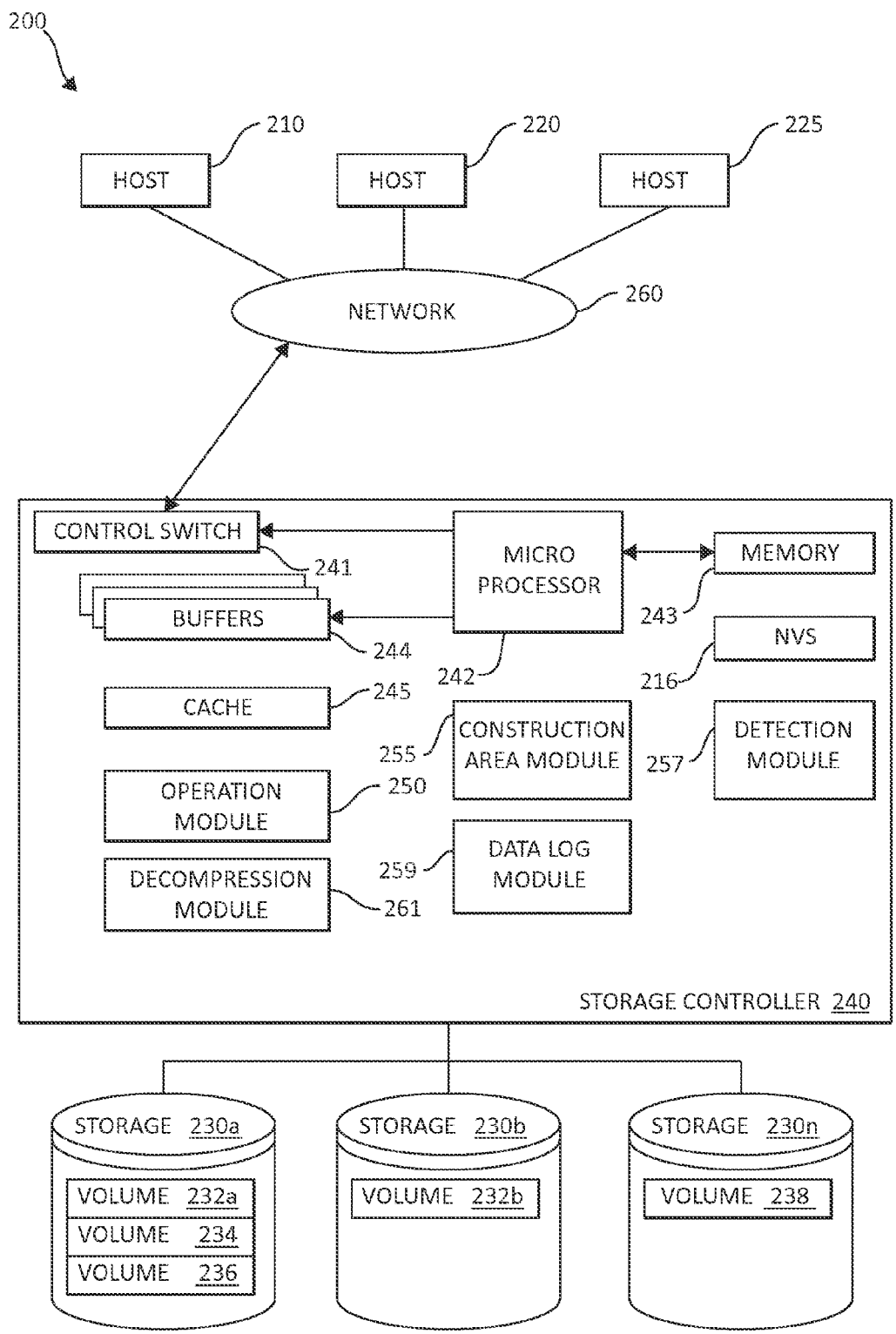
FIG. 2 is a block diagram illustrating a hardware structure of an exemplary data storage system in a computer system in which aspects of the present invention may be realized.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices. The operations of the present invention further described may be executed on device(s) 14, located in system 10 or elsewhere. Memory device 16 and mass storage device 14 may be connected to CPU 12 via a signal-bearing medium or other device available for connection, attachment, and/or communication used by one of ordinary skill in the art. In addition, CPU 12 may be connected through communication port 18 (and/or any other device available for connection, attachment, and/or communication used by one of ordinary skill in the art) to a communication network 20. Also, additional computer systems 22 and 24 may be directly attached to the CPU 12 and/or indirectly attached to the CPU 12 using the communication network 20 and/or the communication port 18 by using any available type of hardware and/or software device available for connection, attachment, and/or communication used by one of ordinary skill in the art. However, the additional computer systems 22 and 24 may not be necessary. The computer system 10 may, but are not necessary, include one or more processor devices (e.g., CPU 12) and additional memory devices 16 for each individual component of the computer system 10 to execute and perform each operation described herein to accomplish the purposes of the present invention. It should be noted that FIG. 1 and/or FIG. 2 are provided as examples of a variety of types of computing architectures for implementing the embodiments of the present invention but should not be viewed as limited computing architectures. In other words, the present invention may use one of a multiplicity of computing architectures with a variety of types of computer architectures, computing hardware, processor devices, and software applications for carrying out the embodiments of the present invention as described herein.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a construction area module 255, a detection module 257, a data log module 259, and a decompression module 261. The construction area module 255, the detection module 257, the data log module 259, and the decompression module 261 may work in conjunction with each and every component of the storage controller 240, the hosts 210, 220, 225, and storage devices 230. Both the construction area module 255, the detection module 257, the data log module 259, and the decompression module 261 may be structurally one complete module or may be associated and/or included with other individual modules. The construction area module 255, the detection module 257, the data log module 259, and the decompression module 261 may also be located in the cache 245 or other components of the storage controller 240 to accomplish the purposes of the present invention.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and construction area module 255, the detection module 257, the data log module 259, and the decompression module 261 in which information may be set. Multiple buffers 244 may be implemented with the present invention as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, and construction area module 255, the detection module 257, the data log module 259, and the decompression module 261 are in communication with each other and may be separate or one individual component(s). Also, several, if not all of the components, such as the operation software 245 may be included with the memory 243. Each of the components within the devices shown may be linked together and may be in communication with each other for purposes suited to the present invention.

Figure 3:
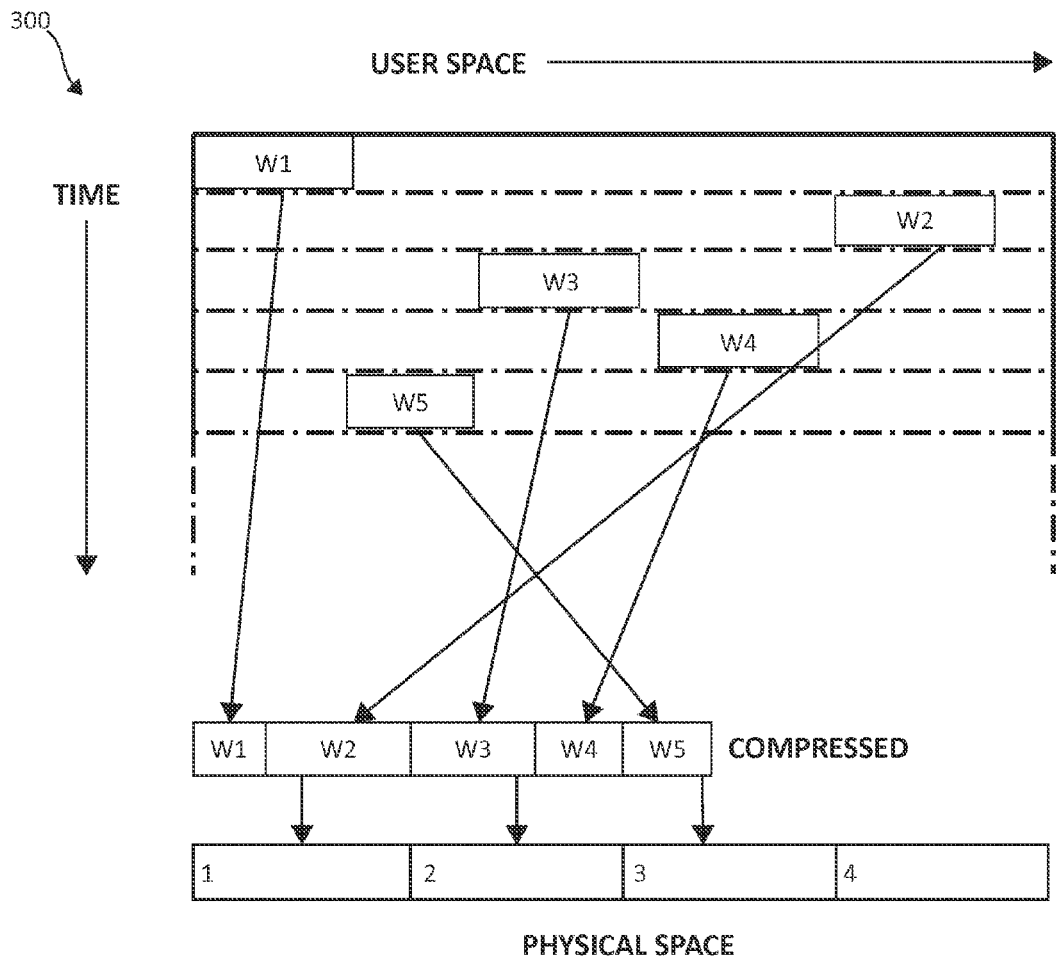
FIG. 3 illustrates an exemplary block diagram showing a compressed journal file system.

FIG. 3 illustrates an exemplary block diagram 300 showing a compressed journal file system. In a compressed journal system, the journal (e.g., block) holds compressed data. As illustrated in FIG. 3, the journaling file system may be used to store the write operations in a journal as shown by W1, W2, W3, W4, and W5 (the block diagram 300 illustrates time on a Y-axis and user space on an X-axis along with directional areas for orientation purposes). The data is compressed as W1, W2, W3, W4, and W5, which then may be stored in block segments 1, 2, 3, and 4. The journal system maintains file system integrity by recording information regarding updates to directories, bitmaps, and/or data, in a log, also called a journal, before the updates are written to a storage device such as a hard disk. In the event of a system crash or other problem, the information in the journal may be used to restore the file system to a consistent state. Full journaling systems additionally perform data journaling, in which data updates are also stored in the journal, to ensure that no committed data is lost. In one embodiment, the ability to access the data randomly is accomplished by dividing the journal into blocks that use a separate dictionary.

Figure 4:
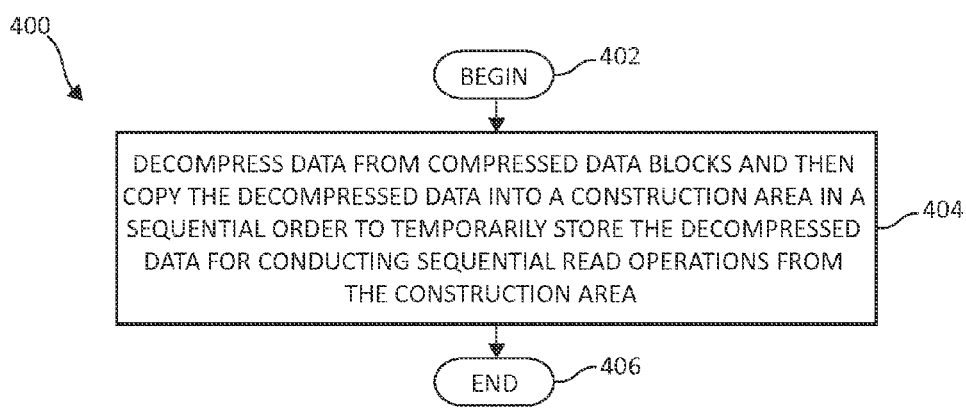
FIG. 4 is a flowchart illustrating an exemplary method for data decompression using a construction area in which aspects of the present invention may be realized.

FIG. 4 is a flowchart illustrating an exemplary method 400 for data decompression using a construction area in which aspects of the present invention may be realized. The method 400 begins (step 402) by decompressing data from compressed data blocks and copies the decompressed data into the construction area in a sequential order to temporarily store the decompressed data for conducting sequential read operations from the construction area (step 404). The method 400 ends (step 406).

Figure 5:
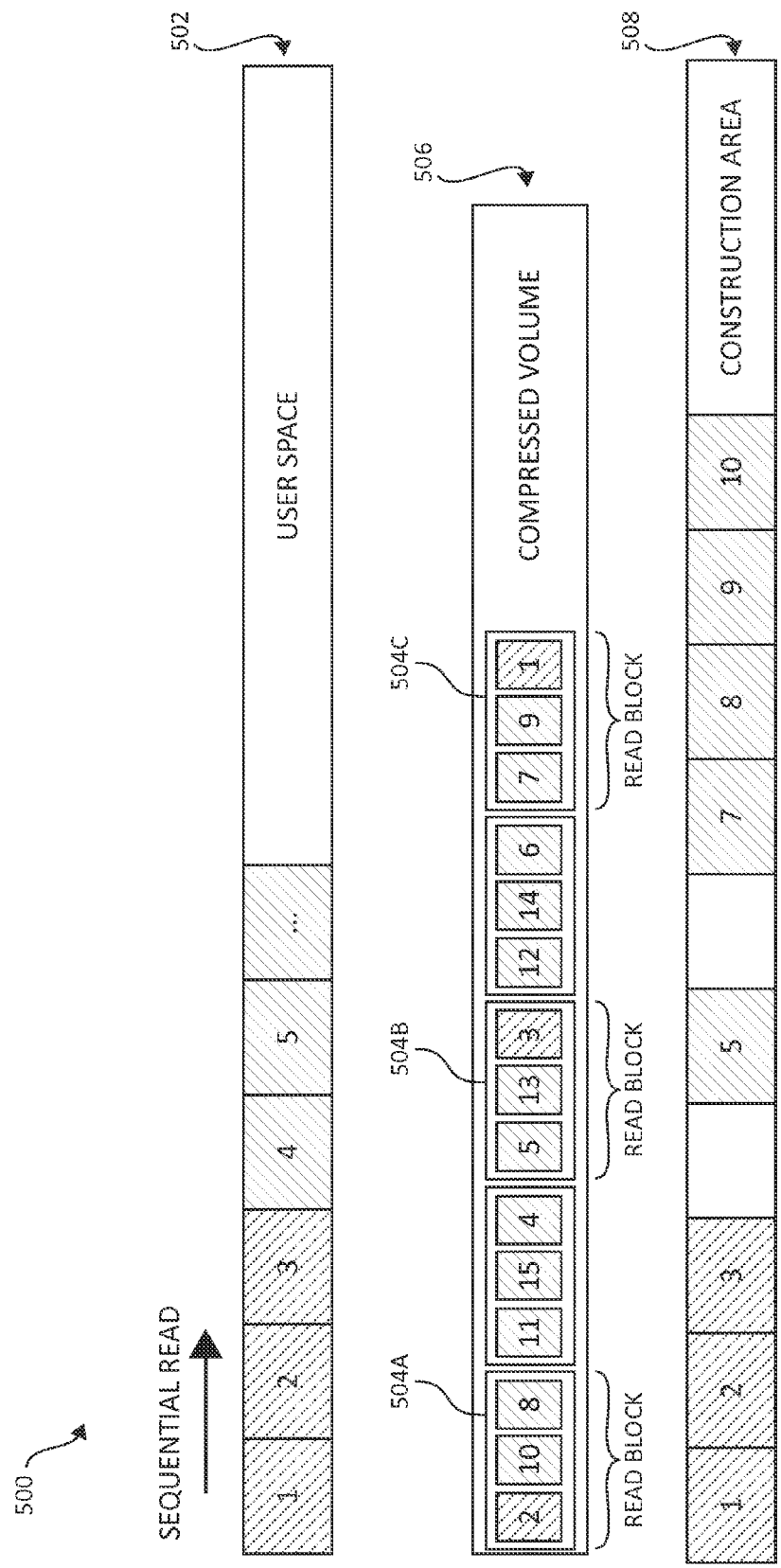
FIG. 5 illustrates an exemplary block diagram showing a sequential read pattern in which aspects of the present invention may be realized.

Turning now to FIG. 5 an exemplary block diagram 500 showing a sequential read pattern is illustrated. In one embodiment, the present invention uses designated sections of a cache memory for the construction area in a compressed volumes storage system, following a detection of sequential read pattern. User space (virtual space) 502 should be divided into segments of reasonable size (e.g., 64 megabytes and/or a predefined size, calculated size, and/or a size determined according to the hardware/software capabilities). This allows determining a boundary on the construction area's 508 size. (For illustration purposes each data block in FIG. 5 is numerically labeled using the numbers 1-15). It should be noted that the virtual space should be divided into reasonable size segments when the system is configured (i.e., before data is written). This way a specific block could hold logs relevant to only one of these segments. Blocks of data 504 (illustrated in FIG. 5 as 504A-C) are read in the compressed volume 506. When sequential read pattern is detected, a region in the cache memory is allocated for a construction area 508.

For handling a user sequential read, the following steps are executed. 1) A sequential read is detected and a construction area is allocated. 2) For each user read, all required blocks are read from the disk/compressed volume (if not already in the cache). It should be noted that each user read is likely to invoke several disk reads (since data was written in a random manner). 3) Data from each read block is decompressed and copied to its designated area in the construction area. 4) The construction area stores the decompressed logs until reached by user sequential read. 5) Along the progress of the user's sequential read, the construction area already consumed is freed and returned to the cache's management algorithm. On optimum conditions, the construction area should allow to read and/or decompress each block exactly once thus reducing IO and CPU overhead to minimum possible.

Figure 6A:
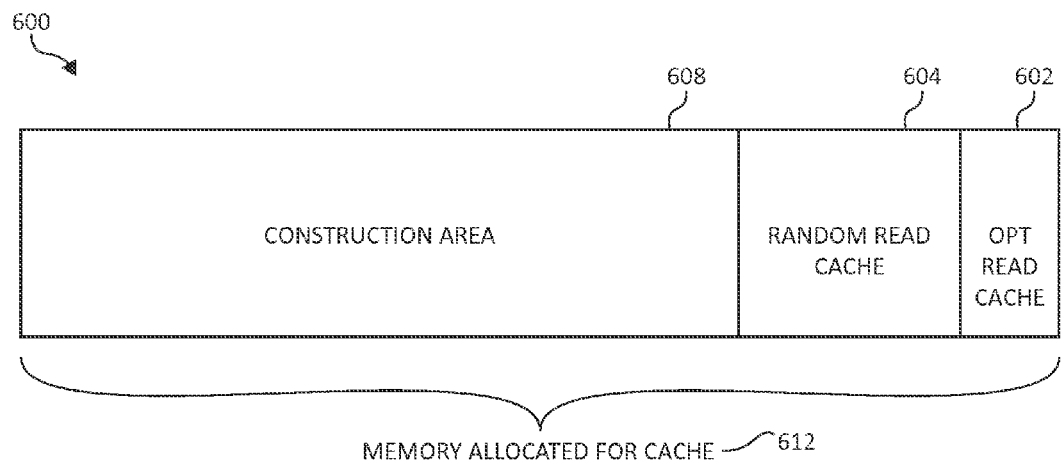
FIG. 6A-C is a block diagram illustrating a cache divided into a construction area and random read cache in which aspects of the present invention may be realized.
Figure 6B:
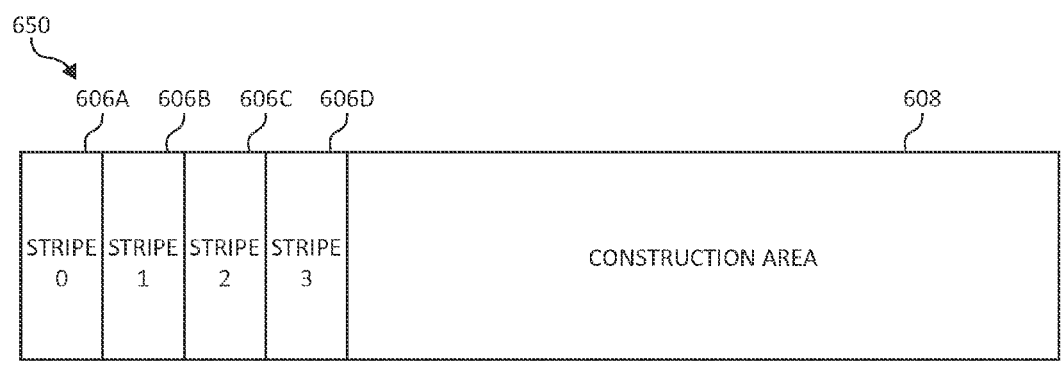
Figure 6C:
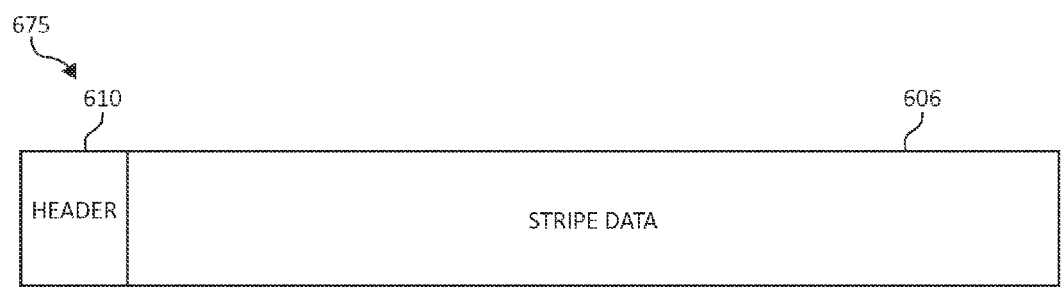

FIG. 6A-C illustrates an exemplary block diagram 600, 650, and 675 showing a cached dividing into a construction area and random read cache. As illustrated in FIG. 6, as one embodiment, in order to address the sequential read challenge, the entire memory 612 allocated for cache in a system may be divided into several separated areas with portions of the cache allocated exclusively for the construction area 608. Other cache regions, for example, such as random read cache 604 and option read cache 602 may be separated out in the cache memory 612. This cache division may, and should, be done dynamically according to the read and write patterns in the storage system at each time.

User virtual space shall be divided into segments. Segment's size should have an upper bound according to the cache size such that a significant part of the segment could be held in the cache's construction area at any time. That is, segment size is advised to be smaller than the size of the cache but improved performance can be achieved even if only a half or third of the segment can fit into the construction area. For example, a segment size is 64 megabytes (MB). This is done to bind the size of the construction area stripe 606 (illustrated as 606A-D in FIG. 6 650) required by each region. The entire area allocated as construction area 608 will be divided into stripes 606 of the same size, and each stripe 606 associated with one segment at a time. A stripe header 610 contains a bitmask describing which chunks are already present on the stripe 606, and each data chunk is of system's I/O granularity size. For example, 16 KB of bitmask data can describe 64 MB segment when using 512 B alignment.

Figure 7:
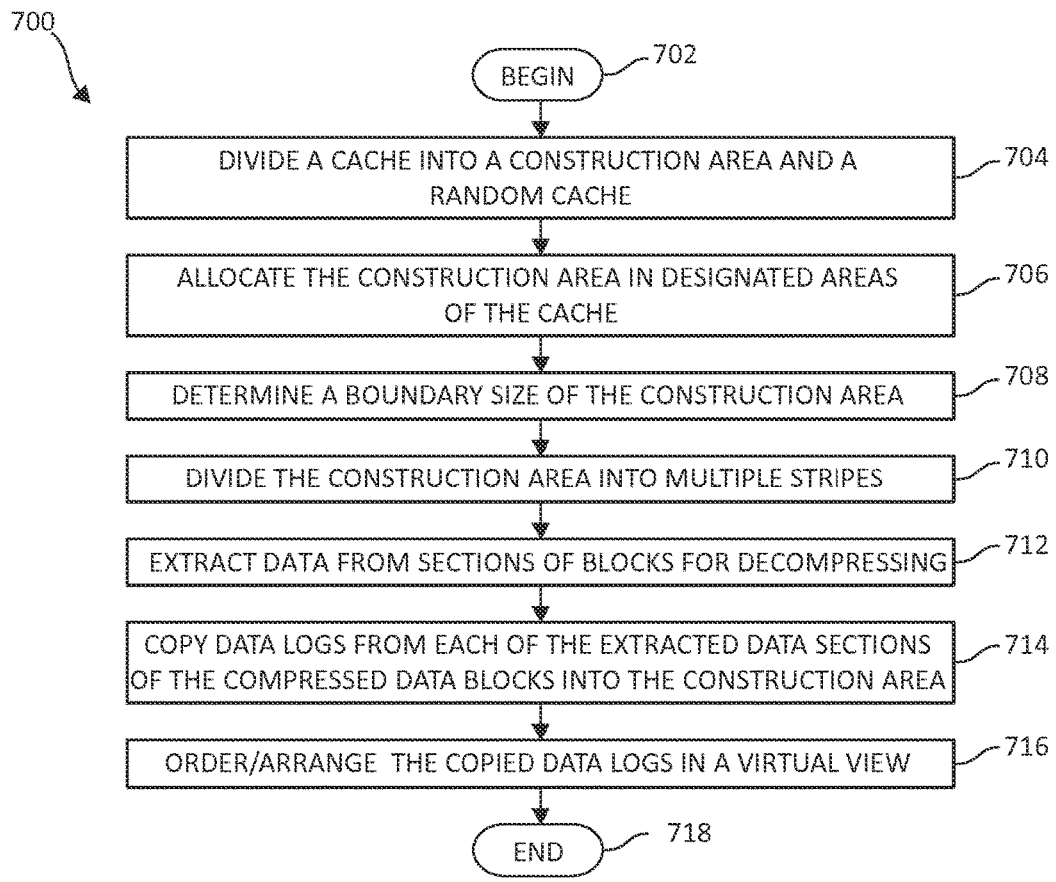
FIG. 7 is a flowchart illustrating an exemplary alternative method for data decompression using a construction area in which aspects of the present invention may be realized.

FIG. 7 is a flowchart illustrating an exemplary alternative method 700 for data decompression using a construction area in which aspects of the present invention may be realized. The method 700 begins (step 702) by dividing a cache into a construction area and a random cache (step 704). The method 700 allocates the construction area in designated areas of the cache (step 706). The method 700 determines a boundary size of the construction area (step 708). The method 700 divides the construction area into multiple stripes (step 710). Each stripe is associated with one similar size segment of virtual space at a time. Also, the construction area in each volume may be divided in half if a required size of the construction area exceeds a total cache size. The method 700 extracts the data from different data sections of compressed data blocks for the decompressing (step 712). The method 700 copies data logs from each of the extracted data sections of the compressed data blocks into the construction area (step 714). The method 700 orders the copied data log(s) in a virtual view (step 716). The method 700 ends (step 718).

Figure 8:
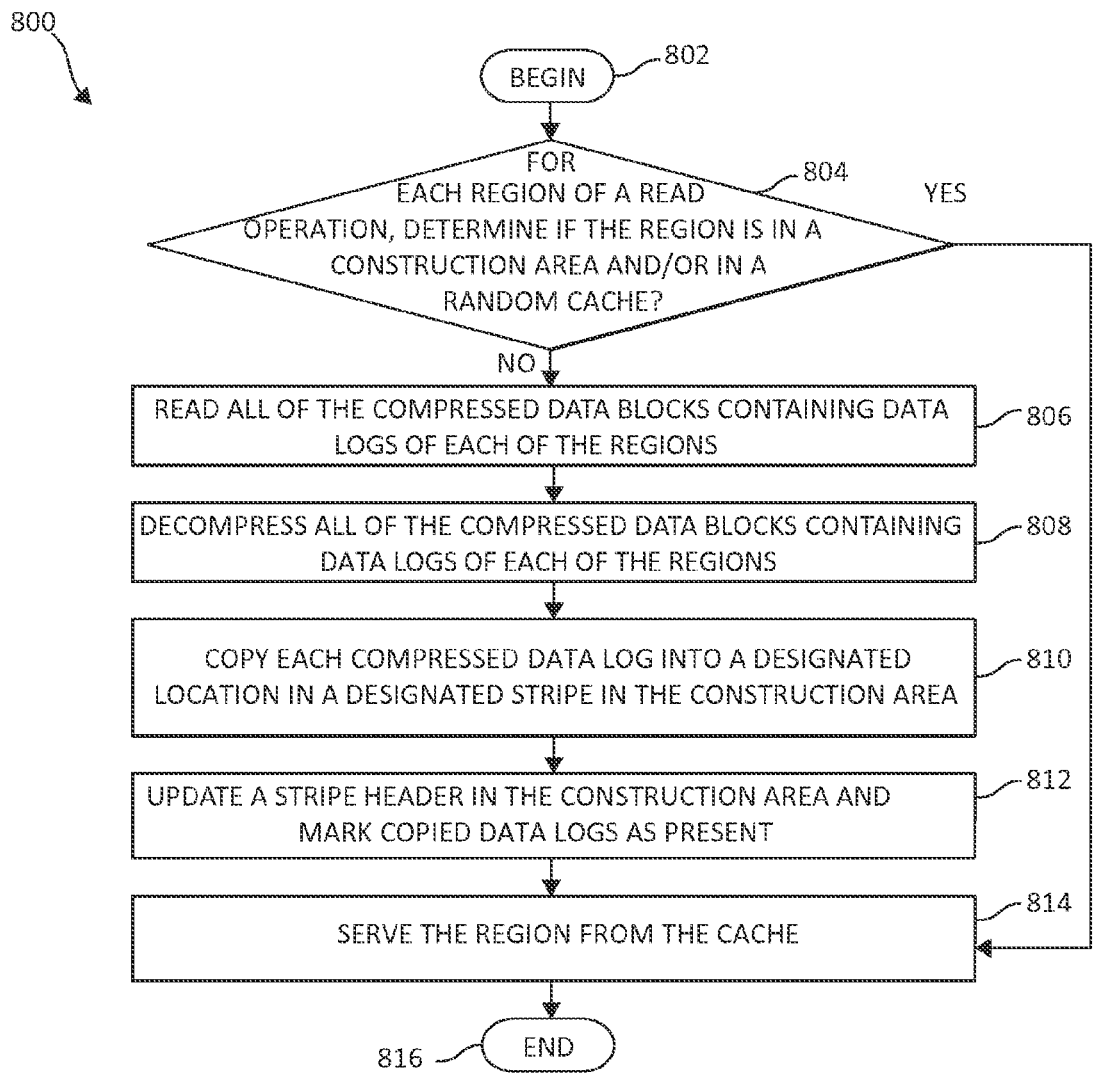
FIG. 8 is a flowchart illustrating an exemplary alternative method for data decompression using a construction area for a read operation in which aspects of the present invention may be realized.

FIG. 8 is a flowchart illustrating an exemplary alternative method 800 for data decompression using a construction area for a read operation in which aspects of the present invention may be realized. The method 800 begins (step 802) by, for each region of the read operation, determining whether each of the regions of the read operation is in a construction area and/or a random cache (step 804). Each region, which is determined to be included in either the construction area and/or the random cache, is served to the user (step 814). For each region, which is determined not to be included in either the construction area and/or in the random cache, all of the compressed data blocks containing its data (e.g., containing the data logs of each of the regions) are read (step 806). All of the compressed data blocks containing the region's data (e.g., data logs of each of the regions) are decompressed (step 808). Each of the compressed data blocks is copied into one of the stripes in the construction area (step 810), and the stripes header in the construction area is updated and the copied data logs are marked as present (e.g., present/existing in the construction area) (step 812). The method 800 ends (step 816).

As illustrated in FIG. 8, the presence of each region that is read should be checked in both the random read cache and the construction area prior to an input/output (I/O) and a decompression task. In case a region is present in one of these structures, that particular region may be served directly from there. For a region missing in both caches: 1) all blocks containing the required region's parts are read, 2) a decompression task is performed for each block, and 3) the uncompressed data is copied to the adequate stripe in the Construction Area. Update the stripe's header according to the copied logs.

It should be noted that write operations will invalidate regions in the cache. For areas present in the construction area there are two alternatives. First, when a region is invalidated, an additional I/O and a decompression task are executed to restore the invalided region into the construction area when a sequential user read reaches the invalidated area. Second, upon a write acknowledgement from the disk, the invalidated region is updated with newly written user data and remains in construction area with new data. This is illustrated below in FIG. 9.

Figure 9:
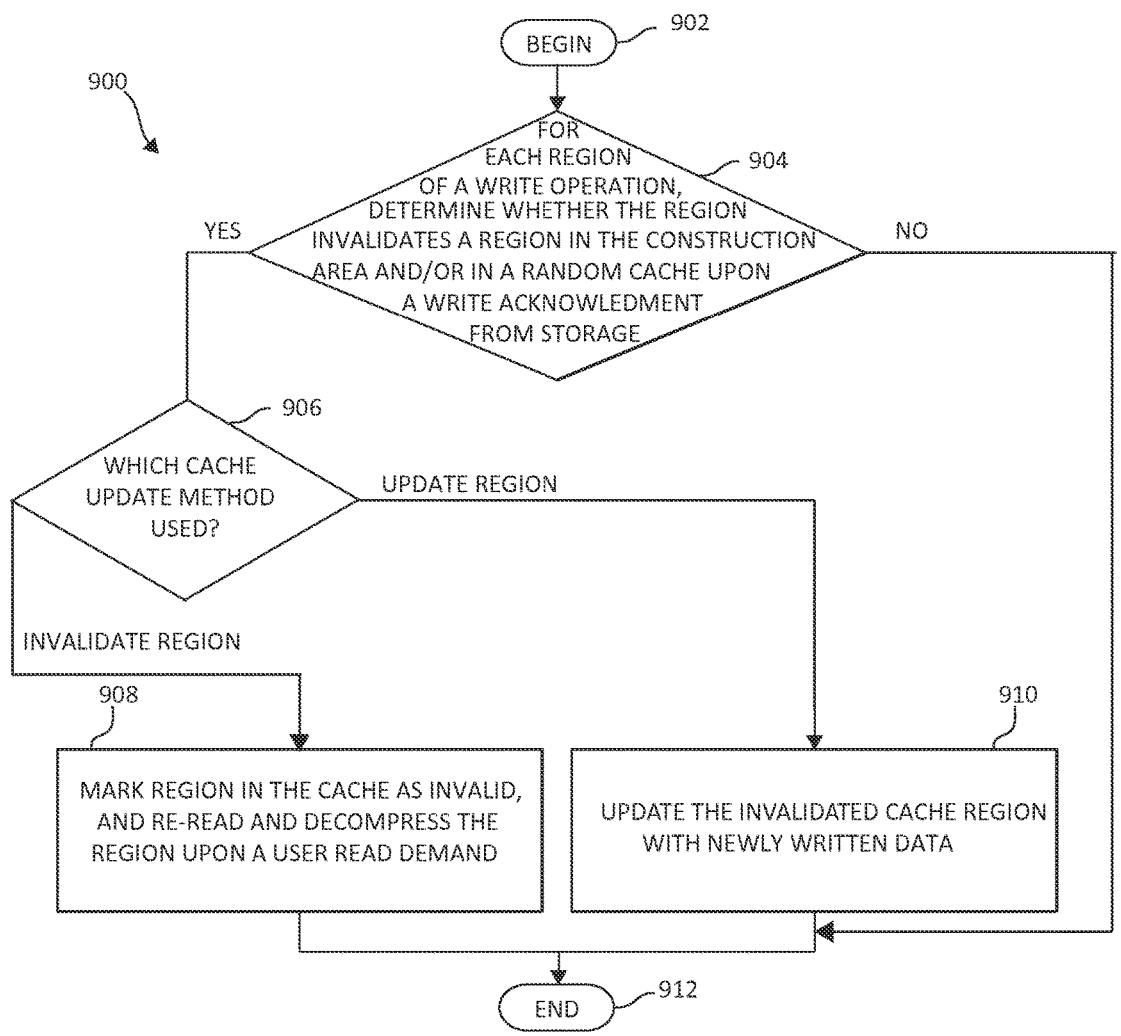
FIG. 9 is a flowchart illustrating an exemplary alternative method for data decompression using a construction area for a write operation in which aspects of the present invention may be realized.

FIG. 9 is a flowchart illustrating an exemplary alternative method 900 for data decompression using a construction area for a write operation in which aspects of the present invention may be realized. The method 900 begins (step 902) by determining if the write operation invalidates any regions in the cache (step 904). If no, the method 900 ends (step 912). If yes, the method 900 determines which cache update method (e.g., updated a region and/or invalidate a region) is to be used (step 906). The method 900 may select one of two options by 1) marking a region in the cache as invalid, and re-reading and decompressing the region upon a user read demand (step 908), and/or 2) upon a write acknowledgement from the disk, updating the invalidated cache region with newly written user data and remains in construction area with new data (step 910). The method 900 ends (step 912). More specifically, at step 906, the region is invalidated, causing an additional I/O and a decompression task to restore the in region into the construction area when sequential user read reaches the invalidated region.

In a further embodiment, in order to enhance the advantages of using the construction area during user sequential read and reduce the lay back of the user sequential read during random I/O, the present invention provides for dynamic allocation of cache sections. Using a decision algorithm, the cache will be divided to two sections, a construction area cache and random cache by the following heuristics. When no sequential read is performed, all cache memory is used as the random cache. The construction area is always preferred over the random cache. Performance improvement using a construction area during sequential read pattern is much more significant then the one gained from using random cache in random I/O pattern. In case a required construction area exceeds cache memory each volumes construction area will be cut in to half. For example, two volumes now with the half segment size construction area cache enhance system performance as compared to one volume with the whole segment size construction area and another using no cache at all. The sequential read using the construction area half the size of a segment will cause up to two reads of each data block (in the worst case scenario).

The construction area improves the sequential read patterns from compressed volumes dramatically. The construction area allows not only a reduction of disk I/O's, but also reduces the CPU utilization. The construction area is most efficient when used in systems in which the user space is divided into segments. In these systems the upper bound for the construction area's size is merely the size of a single segment. The construction area allows efficient sequential read of multiple volumes being read at the same time. In addition, the construction area supports efficient sequential read during on going writes to the read volumes. The construction area also provides for increased computing efficiency for randomly accessed volumes while other volumes are being sequentially read.

In the worst case scenario, the sequential read of user segment write cause the following: the read blocks (I/O) equal the logs in segment, the decompressed blocks equal the logs in segment. Using a Construction Area, the read blocks (I/O) now equal the blocks in segment, and the decompressed blocks now equal the blocks in segment. Each compressed block may hold multiple user logs, depending on the user write size and the compression ration achieved for this data. Thus, the predicted performance improvement using the proposed solution is substantial. For example, consider the following scenario with a system with a cache size equal to 4 GB, a block size equal to 32 KB, a segment size equal to 64 MB (e.g., approximately 700 blocks with 65% compression ratio), active segments equal to 1024, segments being sequentially read equal to 10%, and logs per block equal to/or approximately 20. In this example, the user is reading data in block size (32 KB) chunks.

Using all cache as random cache (LRU), each segment will use approximately 128 cache blocks of size 32 KB. In the worst-case scenario cache hits rate will be approximately 0%. Thus, for each segment the number of blocks read and decompressed is approximately equal to the number of logs read which is approximately equal to the block in segment multiplied by 20.

Using a Construction Area, for each one of the approximately 100 segments being sequentially read a construction area of size approximately 40 MB will be allocated. The cache hit rate for the segments being sequentially read will be greater than and/or equal to 62%. The cache hit rate for the rest of the segments will be approximately 0%. For each sequentially read segment the number of blocks read and decompressed approximately equal to blocks in segment multiplied by 1.6

Thus, in comparison between the construction area versus the LRU cache, for the random accessed segments there is no significant difference. For the sequentially read segments the number of blocks read and decompressed using a construction area is cut to approximately 8%.

In one embodiment, the present invention provides for data decompression using a construction area using at least one processor device in a computing environment. In one embodiment, by way of example only, for reading compressed data stored in a journaling format, the method decompresses data from compressed data blocks and copies the decompressed data into the construction area in a sequential order to temporarily store the decompressed data for conducting sequential read operations from the construction area.

In one embodiment, the present invention detects sequential read patterns from the plurality of compressed data blocks.

In one embodiment, the present invention performs at least one of: dividing a cache into a construction area and a random cache, wherein the random cache is when there are no sequential read operations and the construction area is used for sequential read operations, allocating the construction area in designated areas of the cache, extracting the data from different data sections of the plurality of compressed data blocks for the decompressing, copying data logs from each of the extracted data sections of the plurality of compressed data blocks into the construction area, and/or ordering the copied data logs in a virtual view.

In one embodiment, the present invention performs each one of: freeing each section of the construction area, and redesignating the free sections of the construction area for one of a plurality of cache uses and cyclic buffer implementation.

In one embodiment, the present invention performs at least one of: dividing virtual space into similar size segments, determining a boundary size of the construction area, dividing the construction area into a plurality of stripes, wherein each of the plurality of stripes is associated with one of the similar size segments of virtual space at a time, and/or including dividing the construction area of each one of a plurality of volumes in half if a required size of the construction area exceeds a total cache size.

In one embodiment, the present invention performs, for a read operation, performing at least one of: determining whether one of a plurality of regions of the read operation is in one of a construction area and a random cache, if the one of the plurality of regions is determined to be included in one of the construction area and the random cache: extracting one of the plurality of regions of the read operation, and if the one of the plurality of regions is determined not to be included in one of the construction area and the random cache: reading all of the plurality of compressed data blocks containing each one of the plurality of regions, decompressing all of the plurality of compressed data blocks containing each one of the plurality of regions, copying all of the plurality of compressed data blocks containing each one of the plurality of regions into one of the plurality of stripes in the construction area, and updating a header of one of the plurality of stripes according to copied data logs.

In one embodiment, the present invention performs, for a write operation, restoring to the construction area an invalidated region caused by the write operation by the decompressing.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for data decompression using a construction area by a processor device in a computing environment, the method comprising:
    for reading compressed data stored in a journaling format, decompressing data from a plurality of compressed data blocks and copying the decompressed data into the construction area in a sequential order to temporarily store the decompressed data for conducting sequential read operations from the construction area;
    dividing virtual space into similar size segments;
    determining a boundary size of the construction area;
    dividing the construction area into a plurality of stripes, wherein each of the plurality of stripes is associated with one of the similar size segments of virtual space at a time;
    dividing the construction area of each one of a plurality of volumes in half if a required size of the construction area exceeds a total cache size;
    determining whether one of a plurality of regions of the read operation is in one of a construction area and a random cache;
    if the one of the plurality of regions is determined to be included in one of the construction area and the random cache:
        extracting one of the plurality of regions of the read operation; and
    if the one of the plurality of regions is determined not to be included in one of the construction area and the random cache:
        reading all of the plurality of compressed data blocks containing each one of the plurality of regions,
        decompressing all of the plurality of compressed data blocks containing each one of the plurality of regions,
        copying all of the plurality of compressed data blocks containing each one of the plurality of regions into one of the plurality of stripes in the construction area, and
        updating a header of one of the plurality of stripes according to copied data logs.

2. The method of claim 1, further including dividing a cache into a construction area and a random cache, wherein all of the cache is used as the random cache when there are none of the sequential read operations and the construction area is allocated and used for the sequential read operations.

3. The method of claim 2, further including performing at least one of:
    allocating the construction area in designated areas of the cache,
    extracting the data from different data sections of the plurality of compressed data blocks for the decompressing,
    copying data logs from each of the extracted data sections of the plurality of compressed data blocks into the construction area, and
    ordering the copied data logs in a virtual view.

4. The method of claim 1, further including performing at least one of:
    freeing each section of the construction area, and
    redesignating the free sections of the construction area for one of a plurality of cache uses and cyclic buffer implementation.

5. The method of claim 1, further including, for a write operation, performing at least one of:
    invalidating a matching area in the construction area thereby causing the matching area to be re-read and decompressed, and
    updating a location of the construction area with newly written data upon receiving an acknowledgement from a storage system.

6. A system data decompression using a construction area in a computing environment, comprising:
    at least one processor device, operable in the computing storage environment, wherein the processor device:
        for reading compressed data stored in a journaling format, decompresses data from a plurality of compressed data blocks and copying the decompressed data into the construction area in a sequential order to temporarily store the decompressed data for conducting sequential read operations from the construction area,
        divides virtual space into similar size segments,
        determines a boundary size of the construction area,
        divides the construction area into a plurality of stripes, wherein each of the plurality of stripes is associated with one of the similar size segments of virtual space at a time,
        divides the construction area of each one of a plurality of volumes in half if a required size of the construction area exceeds a total cache size,
        determines whether one of a plurality of regions of the read operation is in one of a construction area and a random cache;
        if the one of the plurality of regions is determined to be included in one of the construction area and the random cache:
            extracts one of the plurality of regions of the read operation, and
        if the one of the plurality of regions is determined not to be included in one of the construction area and the random cache:
            reads all of the plurality of compressed data blocks containing each one of the plurality of regions,
            decompresses all of the plurality of compressed data blocks containing each one of the plurality of regions,
            copies all of the plurality of compressed data blocks containing each one of the plurality of regions into one of the plurality of stripes in the construction area, and
            updates a header of one of the plurality of stripes according to copied data logs.

7. The system of claim 6, wherein at least one processor device divides a cache into a construction area and a random cache, wherein all of the cache is used as the random cache when there are none of the sequential read operations and the construction area is allocated and used for the sequential read operations.

8. The system of claim 7, wherein the at least one processor device performs at least one of:
    allocating the construction area in designated areas of the cache,
    extracting the data from different data sections of the plurality of compressed data blocks for the decompressing,
    copying data logs from each of the extracted data sections of the plurality of compressed data blocks into the construction area, and
    ordering the copied data logs in a virtual view.

9. The system of claim 6, wherein the at least one processor device performs at least one of:
    freeing each section of the construction area, and
    redesignating the free sections of the construction area for one of a plurality of cache uses and cyclic buffer implementation.

10. The system of claim 6, wherein the at least one processor device, for a write operation, performs at least one of:
    invalidating a matching area in the construction area thereby causing the matching area to be re-read and decompressed, and
    updating a location of the construction area with newly written data upon receiving an acknowledgement from a storage system.

11. A computer program product for data decompression using a construction area in a computing environment by a processor device, the computer program product comprising a non-transitory computer-readable storage medium having computer-readable program code portions stored therein, the computer-readable program code portions comprising:
    a first executable portion that, for reading compressed data stored in a journaling format, decompresses data from a plurality of compressed data blocks and copying the decompressed data into the construction area in a sequential order to temporarily store the decompressed data for conducting sequential read operations from the construction area;
    divides virtual space into similar size segments;
    determines a boundary size of the construction area;
    divides the construction area into a plurality of stripes, wherein each of the plurality of stripes is associated with one of the similar size segments of virtual space at a time; divides the construction area of each one of a plurality of volumes in half if a required size of the construction area exceeds a total cache size,
    determines whether one of a plurality of regions of the read operation is in one of a construction area and a random cache;
    if the one of the plurality of regions is determined to be included in one of the construction area and the random cache:
        extracts one of the plurality of regions of the read operation; and if the one of the plurality of regions is determined not to be included in one of the construction area and the random cache:
reads all of the plurality of compressed data blocks containing each one of the plurality of regions,
decompresses all of the plurality of compressed data blocks containing each one of the plurality of regions,
copies all of the plurality of compressed data blocks containing each one of the plurality of regions into one of the plurality of stripes in the construction area, and
updates a header of one of the plurality of stripes according to copied data logs.

12. The computer program product of claim 11, further including a second executable portion that performs at least one of:
dividing a cache into a construction area and a random cache, wherein all of the cache is used as the random cache when there are none of the sequential read operations and the construction area is allocated and used for the sequential read operations,
allocating the construction area in designated areas of the cache,
extracting the data from different data sections of the plurality of compressed data blocks for the decompressing,
copying data logs from each of the extracted data sections of the plurality of compressed data blocks into the construction area, and
ordering the copied data logs in a virtual view.

13. The computer program product of claim 11, further including a second executable portion that performs at least one of:
freeing each section of the construction area, and
redesignating the free sections of the construction area for one of a plurality of cache uses and cyclic buffer implementation.

14. The computer program product of claim 11, further including a second executable portion that, for a write operation, performs at least one of:
invalidating a matching area in the construction area thereby causing the matching area to be re-read and decompressed, and
updating a location of the construction area with newly written data upon receiving an acknowledgement from a storage system.

* * * * *